(12) United States Patent
Kealy et al.

(10) Patent No.: US 7,912,192 B2
(45) Date of Patent: Mar. 22, 2011

(54) ARRANGEMENT FOR MANAGING VOICE OVER IP (VOIP) TELEPHONE CALLS, ESPECIALLY UNSOLICITED OR UNWANTED CALLS

(75) Inventors: Kevin Brian Kealy, Benson, AZ (US); Peter Israel Rosencrantz, Boulder, CO (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1621 days.

(21) Appl. No.: 11/057,999

(22) Filed: Feb. 15, 2005

(65) Prior Publication Data

US 2006/0182029 A1    Aug. 17, 2006

(51) Int. Cl.
*H04M 15/00* (2006.01)
(52) U.S. Cl. .................. 379/114.14; 379/145; 379/189; 379/210.02; 379/210.03
(58) Field of Classification Search .................. 370/352, 370/237; 379/88.13, 114.14, 145, 189, 210.02, 379/210.03
See application file for complete search history.

(56) References Cited

U.S. PATENT DOCUMENTS

| | | | |
|---|---|---|---|
| 6,330,317 B1 | 12/2001 | Garfinkel | |
| 6,366,664 B1 * | 4/2002 | Pullen et al. | .................. 379/237 |
| 6,782,083 B2 * | 8/2004 | Marchand et al. | ....... 379/114.14 |
| 2002/0186683 A1 | 12/2002 | Buck et al. | |
| 2003/0021403 A1 | 1/2003 | Jones | |
| 2003/0152207 A1 | 8/2003 | Ryan | |
| 2004/0205135 A1 * | 10/2004 | Hallam-Baker | .............. 709/206 |

OTHER PUBLICATIONS

Kumar Srivastava et al., "Preventing Spam for SIP-based Instant Messages and Sessions," XP002381421, Oct. 28, 2004, pp. 1-16 (said to be retrieved by European patent examiner from http://www.cs.columbia,edu/techreports/cucs-O42-O4.pdf on May 15, 2006).
J. Rosenberg et al., "The Session Internet Protocol (SIP) and SPAM," Internet Draft for IETF, XP015039614, Oct. 23, 2004.
Spivack, Nova, "A New Solution to Spam: The Internet Member's License," XP-002335509, *Nova Spivack's Journal of Unusual News and Ideas*, retrieved on Jul. 11, 2005 by European patent examiner from Internet URL http://novaspivack.typepad.com/nova_spivacks_weblog/2004/01/a_new_solution_.html, article dated Jan. 26, 2004.

* cited by examiner

*Primary Examiner* — Md S Elahee

(57) ABSTRACT

Trust ratings are embedded in certificates of calling devices in a Voice over Internet Protocol (VoIP) communications system. A method of managing trust ratings involves automatically accumulating complaints concerning VoIP calls initiated from calling devices, and comparing respective quantities of accumulated complaints associated with each calling device. When a quantity of accumulated complaints associated with a given calling device exceeds a given threshold, a trust rating of the given calling device is reduced. In subsequent VoIP calls the given calling device attempts to place, the reduced trust rating is included in the call request so that the subsequent calls are subject to more austere call screening operations than calls having the unreduced trust rating. Call recipients thus affect the calling device's trust rating simply by entering complaints associated with received calls. The method effectively combats spam over Internet telephony (SPIT) through participation of called parties.

10 Claims, 5 Drawing Sheets

ARRANGEMENT FOR MANAGING VOICE OVER IP (VOIP) TELEPHONE CALLS, ESPECIALLY UNSOLICITED OR UNWANTED CALLS

BACKGROUND OF THE INVENTION

1. Field of the Invention

The invention generally relates to arrangements for managing telephone calls carried by Voice over Internet Protocol (VoIP) technology. More particularly, the invention relates to arrangements for enabling users to manage or avoid unsolicited or undesired VoIP calls that constitute spam over Internet telephony (SPIT).

2. Related Art

Telephone calls have become progressively less expensive. As communications costs continue to decrease, the cost of placing a telephone call, particularly one employing voice over Internet protocol (VoIP) technology, approaches zero. The ability to place a call for essentially no incremental cost makes it feasible for marketers to place unsolicited telephone calls—either interactive or with recorded messages—to extremely large quantities of telephone numbers. The evolution toward ubiquity of telephony over the Internet in the form of IP-UNE (Internet Protocol Unbundled Network Element-Line) devices, and particularly in the form of VoIP, makes spam over Internet telephony (SPIT) a problem even to those users who don't realize they are using a VoIP device.

The United States Federal Communications Commission (FCC) determined that, at the time of this writing, VoIP is outside its legislative purview when the entire call is carried on the Internet. Accordingly, conventional legislation, analogous to the "Do Not Call" list but defending against unwanted VoIP telephone calls, is inapplicable. Furthermore, VoIP lends itself to extreme number portability. A U.S. resident may take a soft phone or VoIP Terminal Adaptor (TA) to a foreign country and place calls (SPIT or otherwise), but for practical purposes the calls originate from a U.S. phone and number. It has already been proven that it is impractical to apply U.S. legislation to offshore calls, making VoIP even more attractive to those sending unwanted "junk" telephone calls, or SPIT. Thus, a legislative solution to the SPIT problem is unlikely.

Accordingly, there is a need for a technical solution for managing unwanted telephone calls employing VoIP. In some ways, the problem of spam over Internet telephony might be likened to email spam. However, defenses against email spam are largely ineffective against SPIT. For example, a unique characteristic of telephony is that if a call is rejected it is gone, whereas email remains on a server indefinitely with no concept of a "conversation" that can be selectively and finally terminated. Moreover, emails are asynchronous and email communications do not generally possess a certificate, thus preventing any certificate exchange and testing. Further, email spammers may readily "set up shop" with a new ID (email address or IP address) whenever email from their former ID has been widely blocked. Therefore, such email spam-fighting schemes as a centralized spammer database, and sending emails to a Junk Mail folder based on senders' email addresses, cannot be successfully applied to VoIP calls.

U.S. Pat. No. 6,330,317 (Garfinkel) discloses a call blocking system for use in assisting implementation of do-not-call lists.

U.S. Patent Application Publication No. 2002/0186683 (Buck et al.) discloses a firewall gateway for VoIT that enables voice data transmission through a firewall that would normally block such transmissions, the scheme involving registration of entities with the Internet telephony service provider.

U.S. Patent Application Publication No. 2003/0021403 (Jones) discloses a "passive" call blocking system in which caller identification information is compared with a caller database, and in which rejected callers are not notified when their calls are being rejected.

U.S. Patent No. 2004/0205135 (Hallam-Baker) discloses an arrangement in which electronic messages are either screened by a referee that discriminates desirable from undesirable messages, or are passed if they include a suitable "credential".

U.S. Patent Application Publication No. 2003/0152207 (Ryan) discloses a website-based call screening control center in which a website owner can use a menu to limit and control which communications options that outside callers are able to access.

None of the foregoing documents disclose a solution to the problem of spam over Internet telephony. Thus, there is a need in the art to provide a readily implemented arrangement for managing unwanted telephone calls employing VoIP.

SUMMARY

Trust ratings are embedded in certificates of calling devices in a Voice over Internet Protocol (VoIP) communications system. A method of managing the trust ratings involves automatically accumulating complaints concerning VoIP calls initiated from calling devices and comparing respective quantities of accumulated complaints associated with each calling device. When a quantity of accumulated complaints associated with a given calling device exceeds a given threshold, a trust rating of the given calling device is reduced. In subsequent VoIP calls that the given calling device attempts to place, the reduced trust rating is included in the call request so that the subsequent calls are subject to more austere call screening operations than calls having the unreduced trust rating before the reducing step. Call recipients thus affect the calling device's trust rating simply by entering complaints associated with received calls.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1:
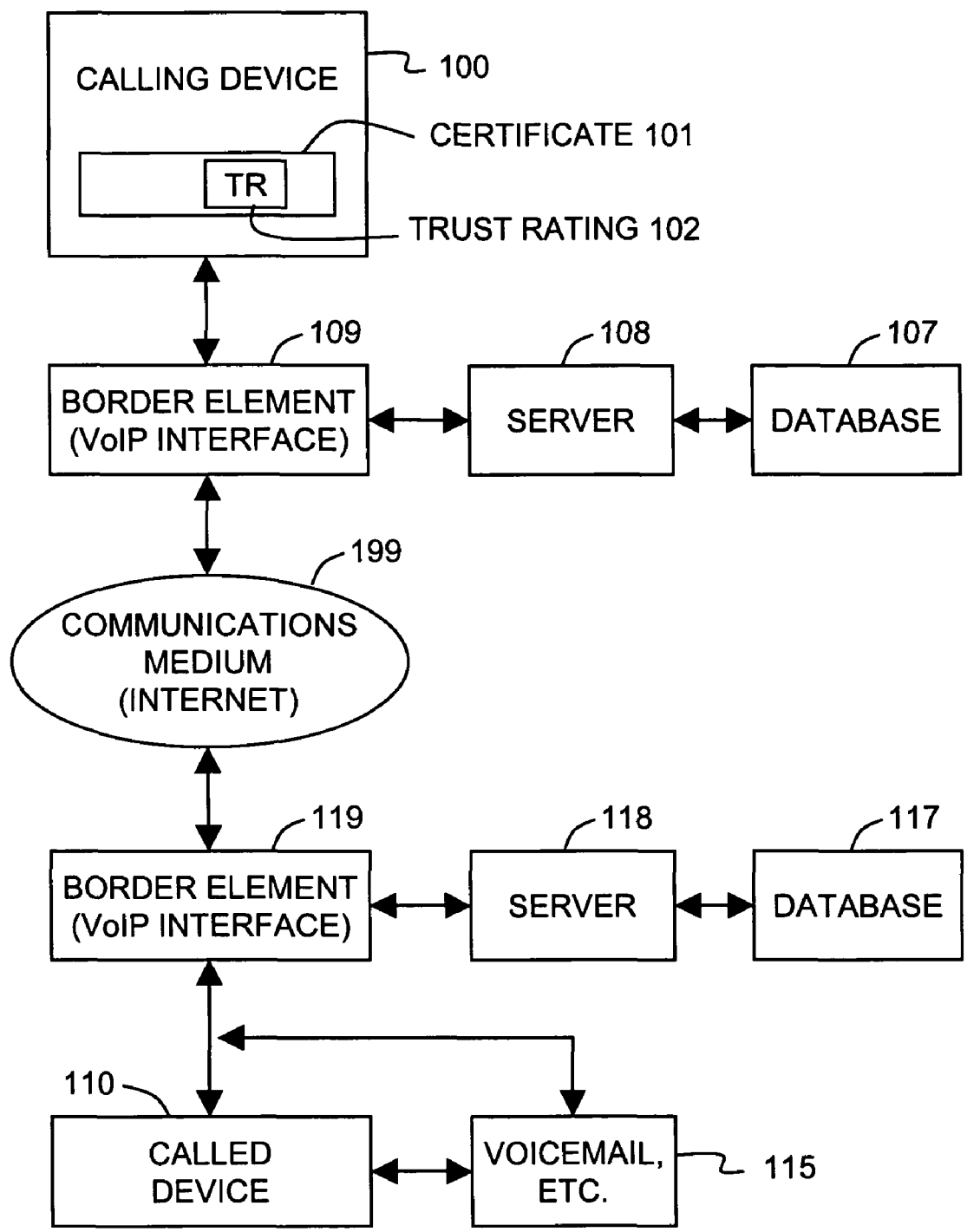
FIG. 1 is a schematic block diagram showing one embodiment of the present VoIP call management arrangement.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, network communications techniques, network management techniques, programming techniques, may be only briefly mentioned or illustrated, their details being easily surmised by skilled artisans. Thus, the steps involved in methods described herein may be readily implemented by those skilled in the art without undue experimentation.

Further, various aspects, features and embodiments of the arrangement may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

The inventive VoIP call management arrangement described herein solves a problem identified with Voice over IP (VoIP), namely, that of unsolicited commercial or other unwanted telephone calls. Distinct from email spam, which has already become an onerous burden to email users worldwide, spam over Internet telephony, or SPIT, becomes a growing issue as VoIP becomes more widely used and calls placed by VoIP spammers (called SPITters) approach zero incremental cost.

The arrangement envisions VoIP service providers and VoIP equipment manufacturers forming a "web of trust" in which a "trust rating" is associated with each telephone or other device capable of placing a VoIP call. Referring to FIG. 1, one such calling device 100 is shown to include an embedded certificate 101 having a "trust rating" field 102.

The trust rating may be embedded in a field within existing and future certificates associated with such devices. The trust rating may be embedded in (for example) as little as two bytes (or even less) of the devices' certificates, to express in ASCII characters a two-digit numeric trust rating for each device. The trust rating field is used to authenticate all VoIP devices such as device 100.

The present call management arrangement provides methods by which the semantics of the field are defined and redefined, methods for managing the value of that field to provide a mechanism for characterizing calls placed by the devices, and methods for using the field to provide call management.

Referring again to FIG. 1, when calling device 100 places a VoIP telephone call to a called device 110, the call is communicated by the Internet or other communications medium 199. VoIP calls are enabled by respective border elements (BEs) 109, 119 that are operated by the same or different VoIP service providers. In the simple illustration of FIG. 1, the border elements also serve VoIP interfaces to the medium (Internet) 199. As is known in the art, border elements may be any elements that allow protected domains to be interfaced, preferably including a firewall. Border elements may be implemented by any suitable device (such as a router) that includes certificate management ability.

Servers such as elements 108, 118 govern VoIP call management using one or more respective databases 107, 117 that store device trust rating information. The servers and databases may be operated by the same or different VoIP service providers or other call management entities.

Incorporating such a "web of trust" using certificates is readily achieved. AT&T Corp., for example, has already mandated use of certificates in all end-user devices; thus it is simple to add a trust rating as an attribute in each certificate. Other VoIP standards such as, for example, PacketCable, also mandate use of certificates for end-point devices. The management of certificates is already well understood and widely implemented in many different fields.

Many service providers, such as AT&T Corp., have maintained certificate authorities for many years. Moreover, many VoIP-capable devices have a certificate supporting a trust field and thus can participate in the web of trust. For example, TLS certificates easily incorporate additional attributes, and even Kerberos tickets have the capacity for arbitrary fields to be defined. The software necessary to maintain trust ratings is not complex to write and can be accomplished inexpensively using, for example, open-source or under a Creative Commons license.

Therefore, there is common support for certificates for end-point devices across the VoIP industry. Service providers maintain a certificate authority (CA) responsible for issuing, maintaining and revoking certificates, and, in the present arrangement, for assigning and modifying trust ratings.

It is envisioned that a certificate 101 including a trust rating field 102 be used to authenticate all VoIP devices or unique user identifiers held within VoIP devices, hence providing a common facility for storing information specific to each device or unique user of such a device. The trust rating field is used to record information relating to the behavior of that device or user (for example, the degree to which has it been reported to make harassing phone calls). For the sake of clarity, further references within this disclosure to "VoIP device" shall be considered to be synonymous with "VoIP device or unique user identifier held within a VoIP device".

Recipients of phone calls determine how to handle calls initiated by VoIP devices of various trust ratings. In this disclosure, the call recipient may also called "user," or a "subscriber" on the principle that he may subscribe to a premium call management service provided, possibly for a fee, in addition to basic VoIP service.

The present arrangement also provides a way for subscribers to identify calls that they have received as coming from a source from which they do not wish to receive any further calls. Special provision is made for handling emergency traffic when users are restricting calls by using a special reserved number. It is difficult for a device owner to fake a high trust rating because the trust rating is maintained and verified by the VoIP service provider or other call management entity.

Figure 2:
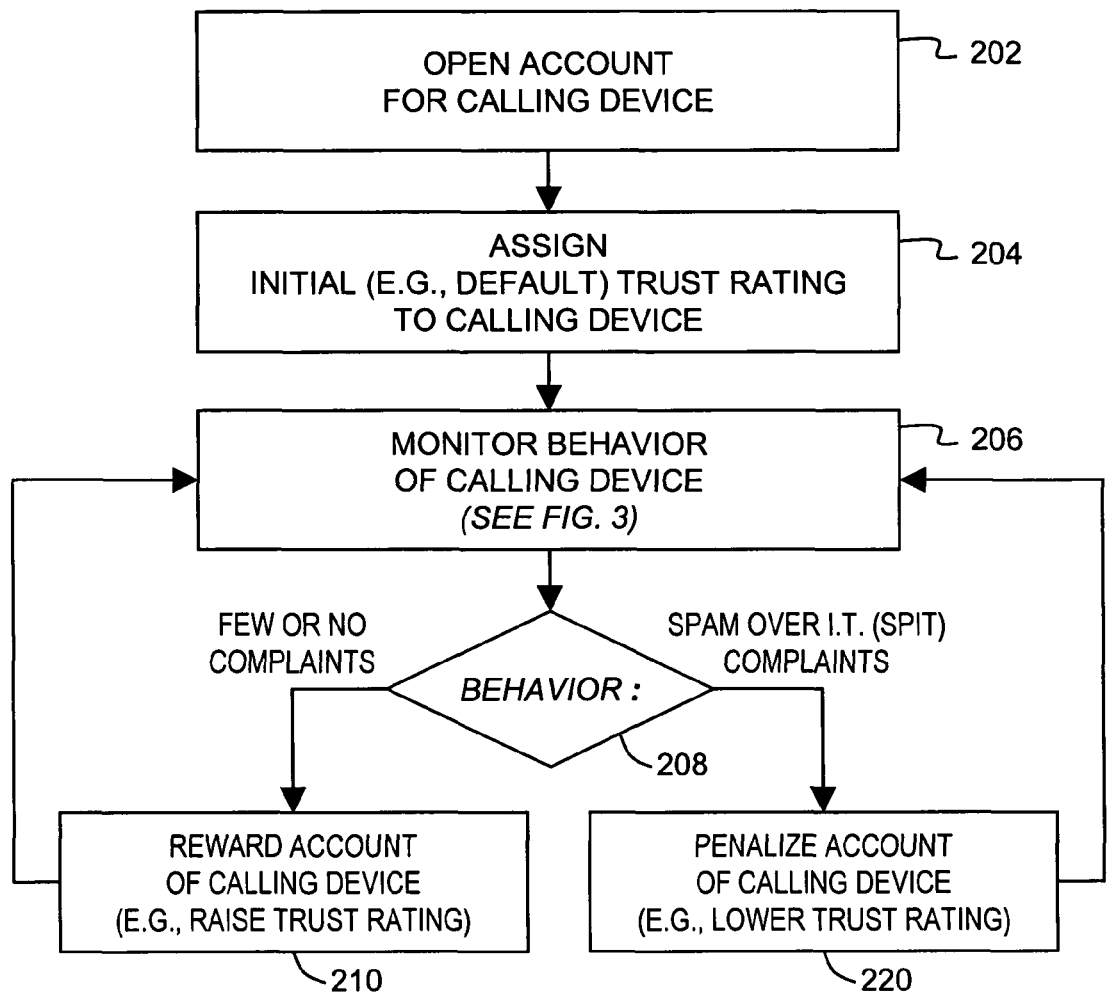
FIG. 2 is a high-level flowchart of one embodiment of a method of assigning and managing trust ratings according to the present VoIP call management arrangement.

FIG. 2 is a high-level flowchart of one embodiment of a method of assigning and managing trust ratings according to the present call management arrangement.

Block 202 indicates the opening of an account for a calling device 100 (FIG. 1). At the time the account is opened, the service provider (or other call management entity) assigns an initial trust rating to the device as indicated by block 204.

One embodiment provides a trust rating scale extending from 1 (least trusted) to 15 (most trusted). This trust rating scale is analogous to the acid-alkaline pH scale in chemistry. Clearly, the invention need not be limited to this particular rating scale.

The initial trust rating may be a default trust rating, or, in special situations a particular trust rating is assigned. Upon granting service to a typical customer, a service provider assigns a default trust rating (for example, 10) to the customer's device. However, for emergency service VoIP devices (law enforcement, medical practitioners, fire and rescue, ambulances, and so on) a special high trust rating (for example, 15) is assigned. Conversely, if a company registers a device as a SPIT purveyor, its device is assigned a low trust rating (for example, 5) so that a VoIP service provider can readily provide "do-not-call" functionality to its subscribers.

After the trust rating is assigned to the device, the device is placed in service. Block 206 indicates the monitoring of the devices in service, as will be described in greater detail with reference to FIG. 3. Most people use their VoIP devices in the same manner as they have used conventional telephones, and are not involved in sending SPIT. A certain number of devices, however, will be involved in SPITting. In either event, the degree to which a device is reported to be involved in SPITting largely determines how the device's account is treated by the service provider (or other management entity), as indicated by decision block 208.

If a given device is seldom or never reported to be a SPITter, then the device's account is rewarded in some manner, such as, for example, by a raised trust rating as indicated by block 210. Conversely, if the given device is reported to be a SPITter beyond a certain threshold number of occurrences in a given time period, then the device's account is penalized in some manner, such as, for example, by a lowered trust rating as indicated by block 220.

A device may earn higher trust ratings in several ways. For example, after six months of on-time bill payment and no reported telephone abuse, a trust rating could rise from the initial value of 10 to an elevated value of 11. For continued good performance, consumers' or businesses' phones could eventually attain a trust rating of 14, the highest for "normal" (non-emergency) phone service. More generally, a trust rating assignment scheme may involve several suggested behaviors used to increment or decrement a user's trust rating.

In addition to incrementing a trust rating, it is also possible to reduce a trust rating. Trust ratings of unregistered SPIT purveyors may be lowered because of reported abuse. Briefly, a call recipient may designate the call as SPIT by signaling to his upstream border element (BE) that the call was SPIT. When a particular caller's certificate has received a given number of complaints (for example, five complaints), from unique recipients, then the abuser's border element (BE) automatically causes the abuser's certificate to be decremented (for example, one point). The decremented trust rating is stored (for example) in database 107, as well as in the trust rating field 102 of the device's certificate 101. Subsequently, the decremented trust rating is presented as a part of outgoing calls. In one decrement scheme, the five complainants must be unique, and all five complaints must be received within a certain time period (for example, one week); otherwise a counter associated with the calling party is reset to zero.

This mechanism allows for the automatic lowering of a trust rating based on received complaints. No affirmative act is required of the call management entity. Also, there need be no user intervention apart from the initial complaint. The decrementing of the trust rating is automatic and cannot be thwarted by the offending caller. The trust-lowering scheme also works when the parties are not on the same provider network, because SPIT-complaint messages are sent from the recipient's network to the caller's network per an interoperation agreement to accept SPIT-complaint messages from other providers.

Figure 3:
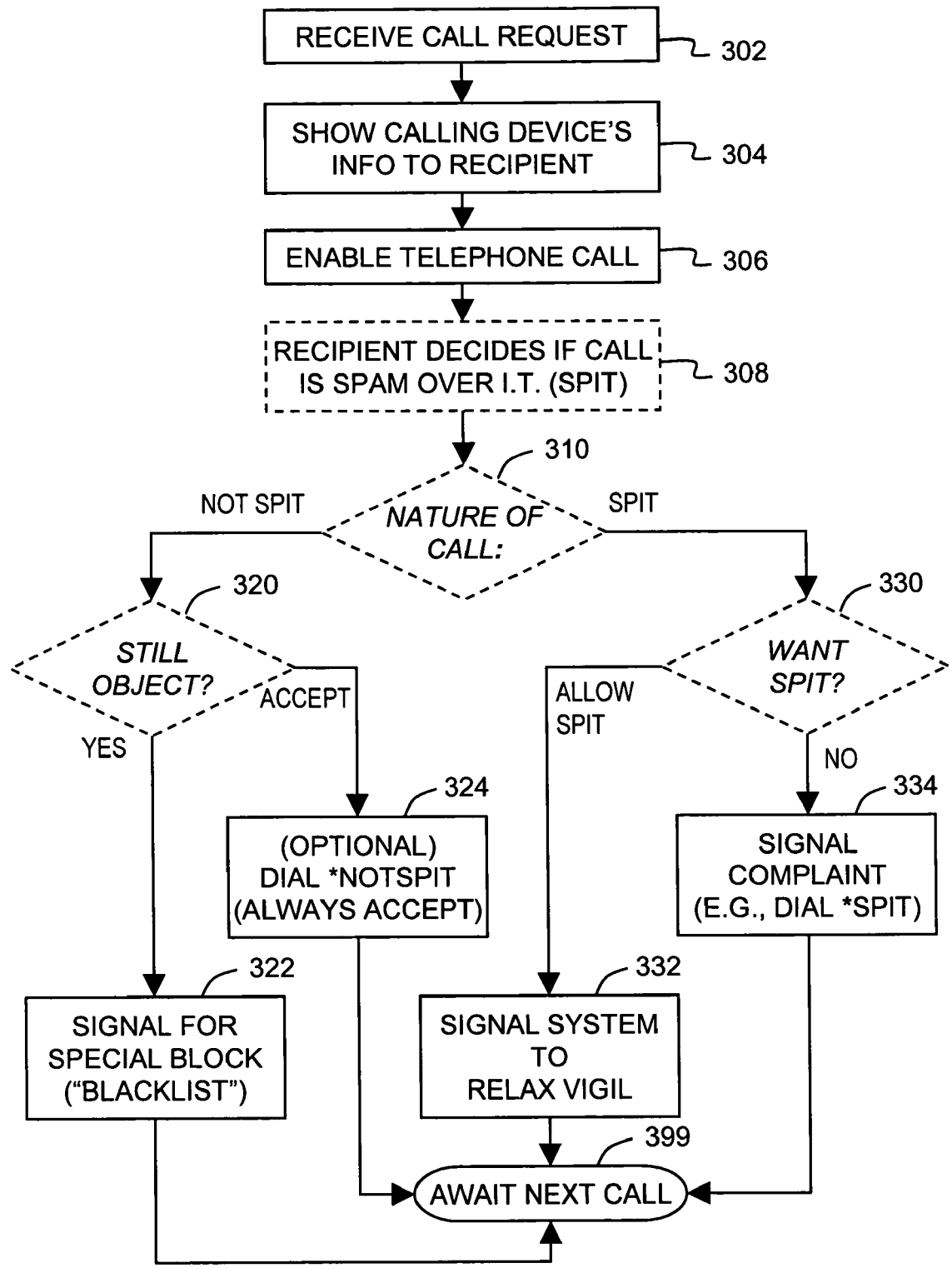
FIG. 3 is a flowchart showing one embodiment of a method by which a call recipient participates in monitoring callers and possibly affecting the callers' trust ratings, and by which the call recipient may specify call screening and call permissions specific to his own receiving device.

FIG. 3 is a flowchart showing one embodiment of a method by which a call recipient participates in monitoring callers and possibly affecting the callers' trust ratings, and by which the call recipient may specify call screening and call permissions specific to his own receiving device.

Block 302 indicates reception of a call request, presumably a call that has not been rejected or diverted to voicemail 115 (FIG. 1). The call request includes the caller's trust rating along with any other information.

Block 304 indicates that the called device 110 (FIG. 1) displays caller information to the recipient. Such information may include the caller's trust rating. The information allows the individual to decide whether to answer the call.

On the assumption that the individual answers the call, block 306 indicates that the call is conducted using VoIP technology as shown in FIG. 1.

Block 308 indicates that the call recipient may decide the nature of the call-whether or not the call is SPIT. Based on the recipient's opinion as to whether or not the call constitutes SPIT, decision block 310 determines different actions that may be taken. If the call recipient decides that the call is not SPIT, then decision block 320 further determines what actions may be taken; but if the call recipient decides that the call constitutes SPIT, then decision block 330 determines what actions may be taken. (In the drawing figures, functions such as 308, 310, 320, 330 that are usually performed by an individual rather than by, a device are drawn in dotted lines rather than solid lines.)

Assuming that the recipient does not consider the call to be SPIT, the recipient can nevertheless customize how future calls are handled, even if he objects to the call or caller for some reason other than SPIT.

For example, block 322 indicates how a call recipient may instruct the VoIP service providers or other call management entities that he wants to avoid all calls from (for example) a given acquaintance. In that case, the management system notes the individual's desire never to be bothered with calls from that caller, and flags that caller as being a "special source" (see FIG. 3 element 308) for that particular call recipient. Such flagged callers are placed on a "blacklist" that is specific to a destination.

The call recipient's reason for avoiding the calls may have nothing to do with the caller being a SPITter as such, but may be (for example) a purely personal or job-related reason. Accordingly, it should not be possible for the call recipient to adversely affect that caller's trust rating, because the trust rating affects the caller's ability to call any destination. Therefore, the blacklist is maintained for the benefit of a particular subscriber's account, so that the account holder may avoid calls from specific callers without being accused of sabotaging the callers' trust ratings.

Such a blacklist may be maintained locally on the subscriber's VoIP equipment, or elsewhere in the infrastructure. The blacklisting is based upon the caller's certificate and its trust rating, not upon his service provider, phone number or IP address. Thus, a person will still be blacklisted even if he changes his phone number or other identifiers, so long as he maintains the same equipment and therefore the same certificate.

If, in decision block 320, the call recipient does not object to the call for any reason (either SPIT or not SPIT-related), then he need take no action. In that case, the system would merely await the next call (block 399). Optionally, if the recipient desires, he may have the caller placed on an "always allow" list that overrides, supersedes or modifies a decision the system may make based only on the caller's trust rating.

For example, if in block 304 the caller's trust rating was shown to be low and in danger of falling into an automatic call-reject category, the call recipient may optionally take action in block 324 to ensure that future calls are not rejected. In one scenario, the call recipient may want to ensure that the caller is placed on the "always allow" list. In this event, the caller is considered to be a "special source" (see FIG. 4 block 408) and is granted special permission for that particular call recipient. Alternatively, the call recipient may simply want to indicate that the call was not SPIT (for example, by dialing *NOTSPIT), so that this particular call could be used by the call management entity as input to, for example, bolster the caller's trust rating.

Regardless of whether the caller was placed on the recipient's blacklist (322) or on the recipient's "always allow" list (324), the system returns to its idle state (399) in anticipation of subsequent calls.

Referring again to decision block 310, if the call recipient decided that the call constitutes SPIT, then the call recipient can take action (governed by block 330) to manage calls from that caller in the future.

If the recipient does not want SPIT, he can complain about the call, for example, by dialing *SPIT (block 334). This recipient's complaint, when gathered with other recipients' complaints, affects the caller's trust rating (see FIG. 2 block 220) so that fewer of that caller's subsequent calls are accepted (see FIG. 4 blocks 416, 418, 420, 422).

Assuming current trends continue, there will always be a portion of the populace that wishes to receive unsolicited offers. These consumers also are unlikely to be interested in a service provider's ability to screen or reject such offers. Block 332 indicates the ability of such consumers to request that the service provider or other call management entity relax or remove screening rules for that caller. In essence, block 332 is analogous to creating an "always allow" list (compare block 324) but whose members may actually be SPITters. Notably, if the subscriber changes his mind and wants to discontinue receiving SPIT from that caller, the consumer's equipment may re-enable the screening function by (for example) dialing *SPIT (block 334) after a subsequent call.

In the event that one consumer receives persistent nuisance calls from one particular caller, but no one else is complaining, the same initial steps are taken. Specifically, the recipient dials *SPIT for each call received (block 334). If the consumer has complained about this caller a given number of times (for example, one to three complaints), possibly within a time period (for example, one week or one month), then that calling device's certificate is automatically added to a recipient's "blacklist" without the recipient having to explicitly request a special blocking (as in block 322).

Figure 4:
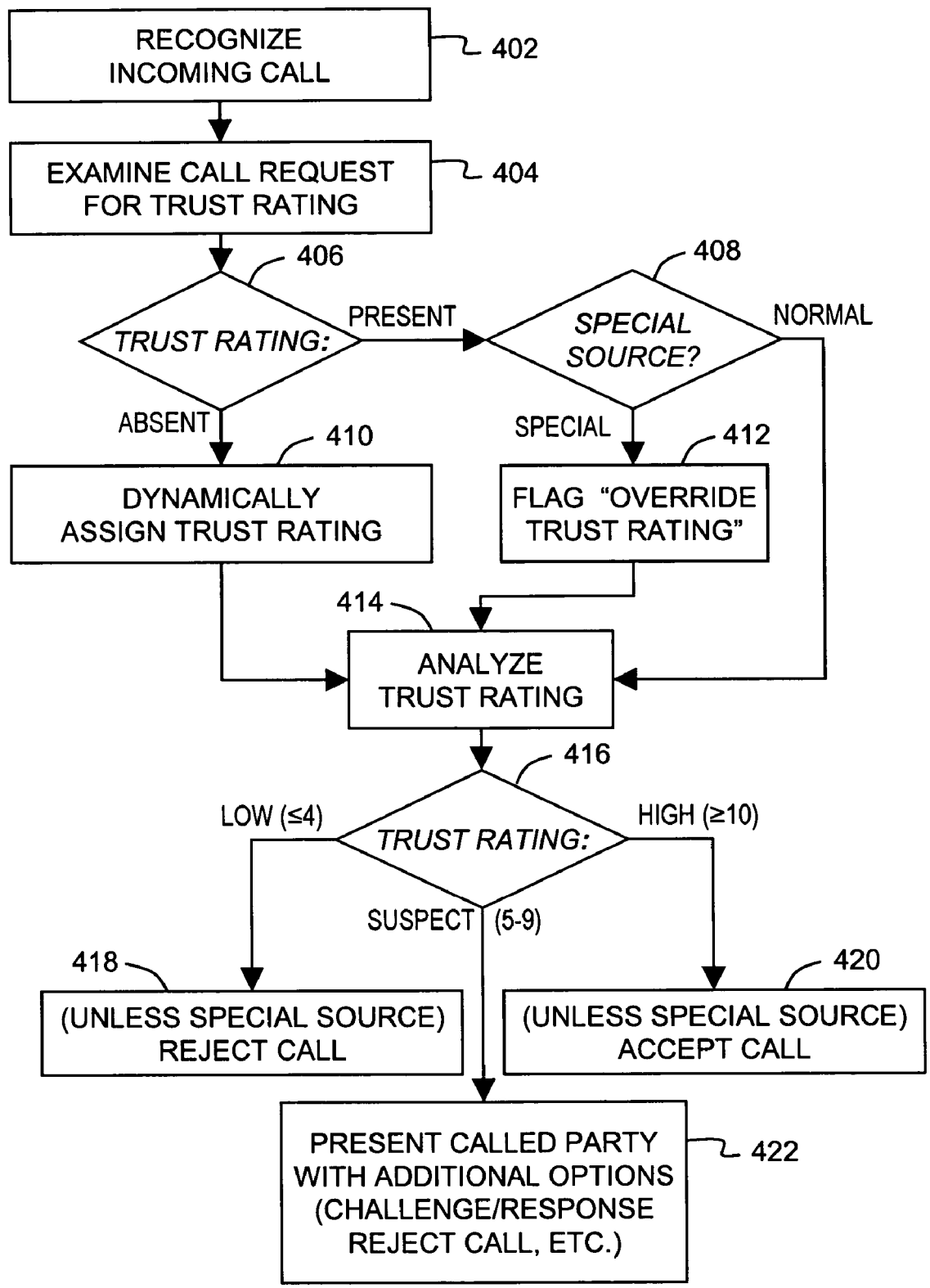
FIG. 4 is a flowchart of one implementation of a method for managing an incoming VoIP telephone call.

FIG. 4 is a flowchart of one implementation of a method for managing an incoming VoIP telephone call.

Block 402 indicates the recognition of the call by at least border element 109. Most VoIP models have a call control element in the setup/tear down of calls, providing an ideal choke point for certificate management. Upon call initiation the border element compares the device's presented certificate with what it thinks is correct. If the presented certificate appears to be correct, then all proceeds normally, but if the presented certificate does not appear to be correct, then the exception is dealt with, for example, by suspension or revocation of the certificate, or assignment of a low trust rating. In one model, the service provider "pushes" a certificate containing updated credentials to the device. If the device is disconnected for some reason, the certificate can be revoked and the credentials expired. If the trust rating is modified, the process happens seamlessly as part of the call setup.

Block 404 indicates the step of checking the call request from the calling device, for presence of a trust rating in a certificate associated with the incoming call. This checking may be performed, for example, by the caller's border element 109 and associated server 108 (FIG. 1). So far, this disclosure has emphasized incoming calls from sources participating in the "web of trust" formed through coordinated use of certificates bearing trust ratings. In the event that a call is received from an off-network (non-participating) device or from a POTS line, it is possible that no credential (trust rating) is present. Trust ratings may be absent from an incoming call for a variety of reasons, including device malfunction. Regardless of the reason a trust rating may be absent in an incoming call, the present arrangement still enables a degree of call screening to take place. In any event, decision block 406 represents the determination of whether a trust rating is present or absent.

Block 410 indicates that, if a trust rating is absent, then a trust rating is assigned. This trust rating may be based on any number of factors, such as, for example, whether or not the caller has blocked its own number from Caller ID (CID) or whether any number presented by Automatic Number Identification (ANI) matches that presented in CID. If they do not match, that can often indicate a spoofed or otherwise tampered-with call.

In one embodiment, incoming calls without embedded trust ratings whose calling devices block CID, are allocated a reduced trust rating (for example, 5), signifying that they should be given a challenge/response opportunity (see discussion of block 422). Furthermore, the border element responsible for maintaining the certificates may also record if an incoming POTS call has been reported as SPIT, and maintain a table correlating ANI information with complaints received, and act on subsequent calls from the same caller, based on this history. ANI is not withheld from the receiving phone switch, even if the caller withholds his number. Furthermore, without access to the service provider's switch, it is not possible for a caller to affect his own ANI information, although it is feasible (particularly with VoIP) to assign arbitrary CID data to an outgoing call. Since the call receiving consumer never sees the incoming ANI data, the caller's privacy is still assured but, advantageously, call recipients can still report such calls as SPIT since the service provider receives, and can cache, the ANI information.

In contrast, incoming calls that do correctly present their caller ID are allocated a higher initial trust rating (for example, 10), and the receiving customer has the option to report the call as SPIT, or to "blacklist" the caller themselves. Blacklisting is discussed with reference to block 322 (FIG. 3). The present arrangement accommodates subscribers who prefer to have the telephone operate like traditional telephones, with all calls coming through without challenge. However, under the inventive arrangement, the subscriber now has the option of identifying calls that are SPIT or changing his trust options in the future.

In any event, after a trust rating is assigned, control passes to block 414.

If, as described above, decision block 406 determines that a valid trust rating is present in association with the incoming call, control passes to block 408. Decision block 408 determines whether the calling party is a "special" source. A source may be special if, for example, it originates from a region known to harbor SPITters or other miscreants, or if the source has been placed on a blacklist or an "always allow" list of the call recipient.

When a VoIP service provider does not participate in the web of trust, behavior is determined by the call recipient and by the service provider. Since the Classless Inter-Domain Routing (CIDR) scheme for IP address conservation was implemented, the nature of IPv4 is such that the general location and service provider of a caller's phone can be determined. Incoming calls from that given region can be allocated a trust rating based on the collective behavior of all callers in that region. For example, if a particular foreign country becomes a major haven for SPIT purveyors or scam operators, then all incoming calls from IP addresses in that foreign country can be allocated a reduced trust rating (for example, 6). This is an enhancement over what is possible on the POTS. Moreover, consumers can still elect to receive calls from specific trustworthy people from that region (for example, by using *NOTSPIT as described with reference to block 324 (FIG. 3)).

If a source is deemed in block 408 to be normal (not "special") then control passes directly to block 414. But if the source of the call is deemed to be special, block 412 sets an "override trust rating" flag before control passes to block 414.

Block 414 indicates analysis of the trust rating regardless of its source (service provider assignment in block 204 or on-the-fly trust rating assignment in block 410). In some embodiments, this analysis also considers whether the "override trust rating" flag is set (block 412) to allow for blacklists (322), for "always allow" lists (324), for subscribers who want to receive SPIT (332), and so forth.

Decision block 416 indicates a decision as to how to respond to an incoming call, based on the analysis performed in block 414. The present arrangement provides various levels of call screening. The following examples of call management rules apply to subscribers who do not wish to receive telephone solicitations, distinguished from the SPIT allowers as described with reference to block 330 (FIG. 3). The examples of call management rules involve trust rating cutoff points (numerical values dividing callers into categories such as Untrusted, Suspect, and Trusted), in association with respective operations that are applied to a requested call.

One example of call management rules is shown in the following table:

| Trust Rating | Category | Call Management Operation |
| --- | --- | --- |
| 1-4 | Untrusted | (FIG. 4 block 418) Reject calls unless consumer has "opted-in" for such calls with the service provider when establishing service, or in block 332 (FIG. 3). |
| 5, 6 | Suspect | (FIG. 4 block 422) Present caller with "challenge/response" scenario, in which the caller is either requested to provide a spoken reason for the call, type his number or identity to allow the call recipient to decide whether or not to accept the call, etc.. Tell recipient the calling device's trust rating. |
| 7-9 | Suspect | (FIG. 4 block 422) Ring as normal, but present subscriber with a "reject call" option like conventional GSM cell phones, but also showing the caller's trust rating. If subscriber rejects call, turn caller away with a recorded message explaining that his call was rejected. Alternatively, send call to voicemail (FIG. 1 block 115) (automatically or manually) for subscriber to deal with at his leisure. |
| 10-14 | Trusted | (FIG. 4 block 420) Accept call. |
| 15 | Special trusted | (FIG. 4 block 420) Always accept call. |

If a source is a "special" source as determined in block 408, then the foregoing example rules of operation are modified in response to the active "override trust rating" flag (412). For example, if the source calls from a region known to harbor SPITters and scammers, then the particular cutoff points and corresponding operations may be made more austere. Conversely, if the source has previously been placed on a particular call recipient's "always allow" list (block D24), then the particular cutoff points and corresponding operations may be made more lenient.

The invention provides an additional method for trust maintenance whereby Certificate Authorities (CA) are motivated to manage the behavior of their subscribers. If a CA provides many certificates to SPITters, then there will be a disproportionate number of SPIT complaints about that CA's subscribers. This information is used by other CAs and service providers to automatically decrement the trust level associated with the root (or signing) certificate of the CA itself. This automatic decrementing of a CA's trust level unilaterally lowers the trust level of all subscribers using that CA's certificates. Being unfairly punished for the actions of SPITters who are also customers of a given CA will cause the legitimate (non-SPITting) users to take their business elsewhere, thus providing an automatic and financial incentive to CAs to manage the behavior of their subscribers.

Figure 5:
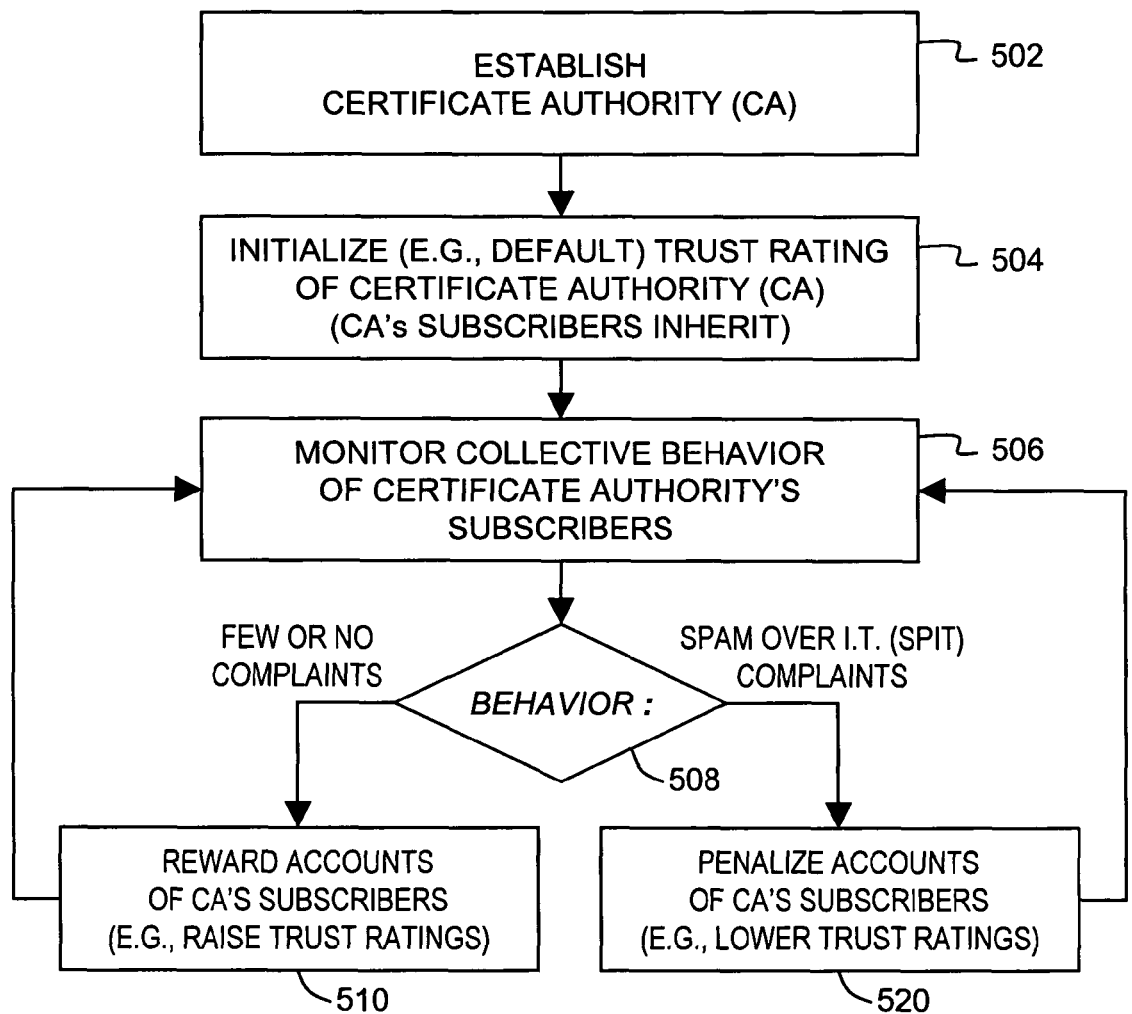
FIG. 5 is a high-level flowchart of one embodiment of a method of assigning and managing trust ratings of customers of a certificate authority (CA) according to the present VoIP call management arrangement.

FIG. 5 is a high-level flowchart of one embodiment of a method of assigning and managing trust ratings of plural (many or all) subscribers of a certificate authority (CA) according to the present VoIP call management arrangement. FIG. 5 strongly resembles the flowchart of FIG. 2, which depicts a method for assigning and managing trust ratings for individual subscribers. The nature of this scheme is that all downstream customers of a given CA share a "signing certificate" that makes it easy for other service providers to identify and possibly penalize customers of an offending CA.

In FIG. 5, block 502 indicates the establishment (formation) of a certificate authority.

Block 504 indicates the assignment of a trust rating to the CA. Normally, this initial trust rating is a default rating assigned to CAs in general. Implicit in block 504 is the inheritance of some of the CA's trust rating by all the CA's subscribers. That is, subscribers' trust ratings are affected by the trust rating assigned to their CA. Immediately after founding of a CA, the effect of this inheritance is minimal or nil because, presumably, the CA begins with a clean SPIT record. However, as the CA's subscribers develop a track record that is imputed to the CA itself, the CA's trust level may be altered and is inherited to some extent by all the subscribers' trust ratings. A CA may have more than one "signing certificate" providing a mechanism whereby a CA may, for example, issue one "tree" of certificates to SPITters and another to "normal" (non-SPITting) subscribers.

Block 506 indicates the ongoing monitoring of the collective SPIT-related behavior of the CA's subscribers.

Block 508 represents a decision as to whether few or no SPIT-related complaints have been received for the CA's subscribers (in which case control passes to block 510), or whether a substantial number of SPIT-related complaints have been received (in which case control passes to block 520). This decision is placed in a context, such as the time frame in which the number of complaints are accumulated, so that trust ratings of subscribers are not unfairly penalized. For example, the number of complaints per subscriber per time period exceeding a predetermined threshold may determine the result of decision block 508.

Block 510 indicates the rewarding of the accounts of the CA's subscribers. For example, the trust ratings of subscribers of CAs whose subscribers have collectively received few or no complaints may be increased. This rewarding may occur if some metric of the collective behavior exceeds a given threshold. For example, such a metric may constitute the number of complaints per subscriber per unit time, and if such metric fulfills a certain threshold, then rewards are provided.

Conversely, block 520 indicates the penalizing of the accounts of the CA's subscribers. For example, the trust ratings of subscribers of CAs whose subscribers have collectively received too many complaints may be reduced.

In either event, control passes back to block 506 for continued monitoring of the collective behavior of the CA's subscribers.

It is recognized that the effect of the CA's trust rating is only one factor affecting the trust rating of the CA's individual subscribers. It is envisioned that, in general, an individual subscriber's SPIT-related behavior should affect that subscriber's trust rating to a much greater degree than that of the CA's trust rating. That is, much greater weighting is applied to the individual subscriber's behavior in FIG. 2 than is the collective behavior of plural subscribers in FIG. 5. However, the corruption or deceptive activity of a CA is effectively policed by the method of FIG. 5.

The disclosed methods may be executed by any appropriate general purpose and/or special purpose processors and/or computer systems employing technology known by those skilled in the art to be appropriate to the functions performed. Appropriate software can readily be prepared by programmers based on the present teachings, using suitable programming languages operating with appropriate operating systems. Generally, such computers include at least one bus (including address, data, control) that connects various elements, including a processor for executing program instructions, memory for holding the program instructions and other data, disks and other storage devices for storing the program instructions and other information, computer readable media storing the program instructions, input and output devices, as well as various other elements such as ASICs, GALs, FPGAs, drivers, accelerators, DMA controllers, and the like. Such computer readable media constitute a computer program product including computer executable code or computer executable instructions that, when executed, causes the computer to perform the methods disclosed herein. Examples of computer readable media include hard disks, floppy disks, compact discs, DVDs, tape, magneto optical disks, PROMs (for example, EPROM, EEPROM, Flash EPROM), DRAM, SRAM, SDRAM, RDRAM, and the like.

The present arrangement has many technological and commercial benefits.

Having a mechanism for handling the trust rating for each calling device, as well as specify responses to particular callers, the present arrangement provides a call management arrangement based on a caller's trust rating as well as a recipient's individual preferences. Network operators can thus offer call control services such as Do-Not-Call, time based priority call pass-through, etc. without any additional machinery. For example, if the user does not wish to receive solicitations by any commercial telephone solicitation company, than he can set his minimum acceptable trust rating to something greater than 5 (in this example, the default value for the trust rating of a registered SPITter), thus effectively blocking calls from those entities.

The call management arrangement works well, even if the caller and recipient subscribe to different VoIP service provides. When a call recipient makes a SPIT complaint, the recipient's service provider 118 passes that complaint back to the caller's service provider 108. Thus, although the call recipient's service provider 118 is not a certificate authority (CA) for calling device 100, the caller's certificate is maintained appropriately by the caller's service provider 108.

The present arrangement provides a universal solution to SPIT, regardless of the level of sophistication of the telephone users involved: sophisticated users who may already be using many types of VoIP telephony devices, and "legacy" users with conventional (non-VoIP) telephones who do not wish to consciously deal with new technology. Even for legacy users, the evolution toward using IP-UNE devices essentially transforms all telephony into VoIP telephony, thus making the present solution fully generalizable. Moreover, such a solution is necessary because the SPIT problem applies even to those users who don't realize they are in fact using a VoIP device.

It is envisioned that a premium fee may be charged for SPIT-controlled VoIP services. Taking the plain old telephone system (POTS) as a model, more tech-savvy consumers tend to select higher-premium services for their conventional phone lines, and also tend to be more selective about what calls they accept: the use of the Do-Not-Call list and services such as caller ID are more prevalent in these groups. Sophisticated consumers may be more willing to pay a premium for a SPIT-free VoIP service, even as calls themselves approach zero incremental cost. Less sophisticated consumers are unlikely to even notice the switchover from the public switched telephone network (PSTN) to VoIP, so that premium SPIT-free service will not likely be of interest. However, if they perceive that SPIT has become a problem, they may complain to customer service, at which time they can be educated as to the new (fee-based) services available.

The present arrangement also envisions ways of handling special cases.

When a caller is unable to reach a party because he has been blacklisted or his trust rating has been set too low, the caller is diverted to a call center to explain reasons for talking with the called party. The service provider can earn revenue in such situations; moreover, subscribers can select premium options for handling such exceptions. For example, the service provider could take the details of the caller and pass them to the called subscriber by email, instant message, Short Message Service (SMS) text messages (to his cell phone) or even a conference call. Based on the called subscriber's decision, actions taken could include: allowing a one-call "trial" from the caller; a rejection; diversion to a voicemail system; and so forth. This mechanism allows for arbitration in the event that the caller has a genuine need to speak with the called. Naturally, once the caller and called have spoken, the called party can take action (such as dialing *NOTSPIT), or perhaps allowing the one-call trial to expire) as needed.

The present arrangement provides a mechanism for prompt dispute resolution in which each subscriber is able to dial a number (or view a web site) that displays his current trust rating. In the same way that consumers are willing to pay to safeguard their credit scores and identities, consumers will likely be willing to pay for a service that monitors their trust rating and notifies them when it is challenged or lowered, allowing them to thwart unfair attacks on their trust rating.

Incoming calls from emergency services (police, medical, fire), being granted a high trust rating (for example, 15), are by default permitted at all times. However, to prevent abuse, it is possible for call recipients to report these calls as SPIT. For example, using a sheriff's department emergency phone to solicit donations would be illegal, and the "emergency" status for that phone or other device would then be in question. In the event that (for example) five SPIT reports are received for an emergency number, the accused abuser's service provider is informed to investigate the usage of that device and to respond appropriately.

The present arrangement makes high-trust rating certificates valuable in their own right. In the same way that identity thieves seek those with good credit and large bank accounts, SPITters will seek those with high-trust rating certificates. Accordingly, service providers may use server(s) 108, 118 and certificate/trust database(s) 107, 117 to ensure that, for example, the IP address of a given phone (or other calling device) matches the certificate so as to prevent cloning or theft of certificates. Certain service providers are already aggressively assuring the source addresses of their customers, so this is a natural extension of existing procedures. This vigilance also addresses the problem of spoofing calls. Normal telephone calls are dialogs and therefore synchronous in nature; but the nature of recorded messages is that no bi-directional communication is needed, since a blind "send" of a recorded message requires no return communication channel.

As the present arrangement of trust becomes more widely implemented, it naturally becomes a target for abuse. For example, miscreants could maliciously attempt to sabotage the trust rating of a victim in what essentially constitutes a denial of service attack. However, under the system of trust, all people reporting a caller as a SPITter must first receive a call from the caller and then report that call as SPIT; advantageously, it is not possible to sabotage a victim's trust rating unless a group of entities (that have all received calls from the victim) have organized for the purpose of such sabotage; this is unlikely, as the group members themselves will be identifiable.

In a worst-case scenario, a service provider's root certificate could become compromised. In that event, a notification would be sent out from the compromised Certificate Authority (CA) to all other CAs, whereupon the other CAs cascade a revocation notice to their own downstream customers. While a new certificate is being issued, all calls from that CA's domain are allocated (for example) an arbitrary trust rating of a neutral 7. This can be accomplished by a "super-CA" key, that is, the one that certified the provider CA certificate. The super-CA sends out a signed message saying that the provider's CA signing certificate is bad and should no longer be used. The super-CA also sends out a message supplying the new provider CA that should be used. When a provider requests and sends out the revocation, it must quickly reissue its device certificates. If there is no super-CA (for example, Verisign), providers may work together to jointly control a super-CA for their own use, in which case the super-CA key is only used with the consent of all participating providers.

Certificates are given a reasonably short lifetime in order to ensure that all the certificates that are currently in use are good. If a certificate were given a very long life, for example, 10 years, then if a provider were to go out of business or cancel its interoperability agreements, the certificates would become stale and unusable. A short certificate life simplifies matters in this event, helping to identify those providers who are presently participating in the web of trust.

From the foregoing, it will be apparent to those skilled in the art that a variety of methods, systems, computer programs on recording media, and the like, are provided.

The foregoing description provides support for a method (FIG. 4) of setting up a Voice over Internet Protocol (VoIP) call from a calling device (100) to a called device (110) using a system in which calling devices generally include a certificate in which a trust rating is embedded. The method involves (404) examining a call request from the calling device, to attempt to read the trust rating embedded in the certificate that is bound to the calling device, and (416) applying at least the trust rating to a set of call management rules, so as to select at least one operation to carry out on the VoIP call. The call management rules may constitute associating progressively austere levels of call screening operations with progressively lower trust ratings, and granting calling devices that have progressively higher trust ratings progressively permissive levels of access to the called device. Finally, the method may involve (418, 420, 422) carrying out the at least one selected operation on the VoIP call.

The examining step may be carried out in a border element (109) of the calling device's VoIP service provider.

The examining step may be carried out in a call terminating device (110).

The call management rules may include (418) associating call requests in a first category of lowest trust ratings with an operation of conditionally rejecting the VoIP call; (422) associating call requests in a second category of intermediate trust ratings with an operation of conditionally completing the VoIP call; and (420) associating call requests in a third category of highest trust ratings with an operation of unconditionally completing the VoIP call.

The method may further involve (410) dynamically assigning a trust rating to the call request, if the examining step (404) fails to read a trust rating from the call request.

The present disclosure further supports a method (FIGS. 2, 3) permitting a prospective call recipient user to participate in management of Voice over Internet Protocol (VoIP) calls received from a calling device. The method may involve (306) enabling the user to conduct the VoIP call with the calling device (100); (334) accepting an input from the user indicating the user's complaint that the VoIP call constitutes spam over Internet telephony (SPIT); (220) in response to at least one user complaint, reducing a trust rating embedded in a certificated bound to the calling device; and (206) sending subsequent calls with respective call requests including the reduced trust rating, so that the subsequent calls having the reduced trust ratings are subject to more austere call screening operations than the call having the unreduced trust rating before the reducing step.

The method may further involve (306) enabling the user to conduct a second VoIP call with a second calling device; and (324, "always accept") accepting a second input from the user indicating the user's instruction to accept future calls from the second calling device, regardless of a second trust rating embedded in the certificate in the second calling device.

The method may further involve (306) enabling the user to conduct a second VoIP call with a second calling device; and (322, "blacklist") accepting a second input from the user indicating the user's instruction to reject future calls from the second calling device, regardless of a second trust rating embedded in the certificate in the second calling device.

The method may further involve (306) enabling the user to conduct a second VoIP call with a second calling device; and (332) accepting a second input from the user indicating the user's instruction to relax call management rules governing future calls from the second calling device, regardless of a second trust rating embedded in the certificate in the second calling device.

The present disclosure also supports a method (FIG. 2) of managing trust ratings that are embedded in certificates of calling devices in a Voice over Internet Protocol (VoIP) communications system. The method may involve automatically accumulating complaints concerning VoIP calls initiated from calling devices, and (208) comparing respective quantities of accumulated complaints associated with each calling device. When a quantity of accumulated complaints associated with a given calling device exceeds a given threshold, the method may involve (220) reducing a trust rating of the given calling device; and in call requests of subsequent VoIP calls that the given calling device attempts to place, the method may further involve including the reduced trust rating so that the subsequent calls are subject to more austere call screening operations than calls having the unreduced trust rating before the reducing step.

After the comparing step, when a quantity of accumulated complaints associated with a second calling device does not exceed a second threshold, the method may further involve (210) increasing a trust rating of the second calling device; and in call requests of subsequent VoIP calls that the second calling device attempts to place, the method may further involve including the increased trust rating so that the subsequent calls are subject to less austere call screening operations than calls having the un-increased trust rating before the increasing step.

After the comparing step, when a quantity of accumulated complaints associated collectively with the customers of a Certificate Authority (CA) exceeds a collective threshold, the method may further involve (520) decreasing the overall trust rating of all certificates signed by or derived from that CPA's root certificate.

After the comparing step, the method may further involve (510) automatically increasing the CA's overall trust level after a metric has surpassed a metric-related threshold.

The metric-related threshold may include a measurement of a quantity of complaints received in a probationary time period, and the method may further involve, after the comparing step, (510) automatically increasing the CA's overall trust level after the probationary time period has passed if a quantity of complaints received during the time period is less than the measurement.

The present disclosure further supports computer program products including computer executable code or computer executable instructions that, when executed, causes a computer to perform the methods described herein.

The present disclosure further supports systems configured to perform the methods described herein.

Many alternatives, modifications, and variations will be apparent to those skilled in the art in light of the above teachings. For example, the relative location of elements such as servers, databases, and the like, may be varied while remaining within the scope of the present invention. Likewise, the steps involved in methods described herein may be implemented in a manner different than as described above. Moreover, it is recognized that operational elements may be located at different relative locations than as disclosed herein. It is therefore to be understood that within the scope of the appended claims and their equivalents, the invention may be practiced otherwise than as specifically described herein.

What is claimed is:

1. A method for permitting a call recipient user to participate in management of voice over internet protocol calls received from a calling device, the method comprising:
   enabling the call recipient user to receive a voice over internet protocol call from the calling device;
   accepting an input from the call recipient user indicating that the voice over internet protocol call constitutes a spam over internet telephony;
   reducing a trust rating to provide a reduced trust rating associated with a certificate bound to the calling device, in response to the input; and
   sending subsequent call requests from the calling device including the reduced trust rating, so that the subsequent call requests having the reduced trust rating are subjected to a call screening in accordance with the reduced trust rating if the reduced trust rating reaches a trust rating cutoff point of a next trust rating category.

2. The method of claim 1, further comprising:
   enabling the call recipient user to receive a second voice over internet protocol call from a second calling device; and
   accepting a second input from the call recipient user indicating the call recipient user's instruction to accept future calls from the second calling device, regardless of a second trust rating associated with a certificate bound to the second calling device.

3. The method of claim 1, further comprising:
   enabling the call recipient user to receive a second voice over internet protocol call from a second calling device; and
   accepting a second input from the call recipient user indicating the call recipient user's instruction to reject future calls from the second calling device, regardless of a second trust rating associated with a certificate bound to the second calling device.

4. The method of claim 1, further comprising:
   enabling the call recipient user to receive a second voice over internet protocol call from a second calling device; and
   accepting a second input from the call recipient user indicating the call recipient user's instruction to relax call management rules governing future calls from the second calling device, regardless of a second trust rating associated with a certificate bound to the second calling device.

5. A computer program product including a computer-readable storage medium storing computer executable instructions that, when executed, cause a computer to perform a method for permitting a call recipient user to participate in management of voice over internet protocol calls received from a calling device, the method comprising:
   enabling the call recipient user to receive a voice over internet protocol call from the calling device;
   accepting an input from the call recipient user indicating that the voice over internet protocol call constitutes a spam over internet telephony;
   reducing a trust rating to provide a reduced trust rating associated with a certificate bound to the calling device, in response to the input; and
   sending subsequent call requests from the calling device including the reduced trust rating, so that the subsequent call requests having the reduced trust rating are subjected to a call screening in accordance with the reduced trust rating if the reduced trust rating reaches a trust rating cutoff point of a next trust rating category.

6. A method of managing trust ratings that are associated with certificates of calling devices in a voice over internet protocol communications system, the method comprising:
   automatically accumulating complaints concerning voice over internet protocol calls initiated from each of the calling devices;
   comparing respective quantities of accumulated complaints associated with each of the calling devices;
   when a quantity of accumulated complaints associated with a given calling device of the calling devices exceeds a given threshold, reducing a trust rating of the given calling device to provide a reduced trust rating; and
   in subsequent voice over internet protocol call requests made by the given calling device, including the reduced trust rating so that the subsequent call requests having the reduced trust rating are subject to a call screening in accordance with the reduced trust rating if the reduced trust rating reaches a trust rating cutoff point of a next trust rating category.

7. The method of claim 6, further comprising, after the comparing:
- when a quantity of accumulated complaints associated with a second calling device of the calling devices is below a second threshold, increasing a trust rating of the second calling device to provide an increased trust rating; and
- in subsequent voice over internet protocol call requests made by the second calling device, including the increased trust rating so that the subsequent call requests having the increased trust rating are subjected to a call screening in accordance with the increased trust rating.

8. The method of claim 6, further comprising, after the comparing:
- when a quantity of accumulated complaints associated collectively with customers of a certificate authority exceeds a collective threshold, decreasing a trust rating of all certificates derived from a root certificate of the certificate authority.

9. The method of claim 8, further comprising, after the comparing:
- automatically increasing a trust level associated with the root certificate of the certificate authority after a metric has surpassed a metric-related threshold.

10. The method of claim 9, wherein:
- the metric-related threshold includes a measurement of a quantity of complaints received in a probationary time period; and
- the method further comprises, after the comparing, automatically increasing the trust level associated with the root certificate of the certificate authority after the probationary time period has passed if the quantity of complaints received during the probationary time period is less than the measurement.

* * * * *